(12) United States Patent
Shoji et al.

(10) Patent No.: US 10,818,895 B2
(45) Date of Patent: Oct. 27, 2020

(54) BUS BAR MODULE AND POWER SUPPLY UNIT

(71) Applicant: YAZAKI CORPORATION, Tokyo (JP)

(72) Inventors: Takao Shoji, Shizuoka (JP); Shinichi Yanagihara, Shizuoka (JP); Motoo Nojima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 289 days.

(21) Appl. No.: 15/970,829

(22) Filed: May 3, 2018

(65) Prior Publication Data

US 2018/0342717 A1 Nov. 29, 2018

(30) Foreign Application Priority Data

May 26, 2017 (JP) .................. 2017-104654

(51) Int. Cl.
| | |
|---|---|
| *H01M 2/00* | (2006.01) |
| *H01M 2/10* | (2006.01) |
| *H01M 2/20* | (2006.01) |
| *H01M 10/04* | (2006.01) |
| *H01M 10/48* | (2006.01) |
| *B60L 50/64* | (2019.01) |

(52) U.S. Cl.
CPC .......... *H01M 2/1077* (2013.01); *B60L 50/64* (2019.02); *H01M 2/1083* (2013.01); *H01M 2/206* (2013.01); *H01M 10/0431* (2013.01); *H01M 10/482* (2013.01); *H01M 10/486* (2013.01); *H01M 2220/20* (2013.01)

(58) Field of Classification Search
CPC ............. H01M 2/1077; H01M 10/486; H01M 10/482; H01M 10/0431; H01M 2/206; H01M 2/1083; H01M 2220/20; B60L 50/64
See application file for complete search history.

(56) References Cited

U.S. PATENT DOCUMENTS

2011/0064986 A1\* 3/2011 Ogasawara ........... H01M 2/206
429/121

FOREIGN PATENT DOCUMENTS

JP 2014-233160 A 12/2014

\* cited by examiner

*Primary Examiner* — Nicholas P D'Aniello
(74) *Attorney, Agent, or Firm* — Kenealy Vaidya LLP

(57) ABSTRACT

A bus bar module includes a plurality of bus bars in which a plurality of battery cells of a battery assembly electrically connect to each other, a plurality of electric wires electrically connected to the plurality of bus bars, and an electric wire routing structure that accommodates the plurality of electric wires. The electric wire routing structure includes a plurality of electric wire routing grooves formed in an upwardly opening gutter shape and disposed along an overlapping direction of the plurality of battery cells, and a plurality of lids connected to first side walls of the plurality of electric wire routing grooves via hinges so as to be rotatable and covering the plurality of electric wire routing grooves so as to block groove openings of the plurality of electric wire routing grooves, respectively.

8 Claims, 9 Drawing Sheets

BUS BAR MODULE AND POWER SUPPLY UNIT

CROSS REFERENCE TO RELATED APPLICATIONS

This application claims priority from Japanese Patent Application No. 2017-104654 filed on May 26, 2017, the entire contents of which are incorporated herein by reference.

BACKGROUND OF THE INVENTION

Field of the Invention

The present invention relates to a bus bar module forming a power supply unit that is used in a hybrid vehicle, an electric vehicle, or the like, and a power supply unit including the bus bar module.

Description of Related Art

A power supply unit is mounted on various vehicles, for example, an electric vehicle that travels using an electric motor or a hybrid vehicle that travels using an engine and an electric motor together. This power supply unit includes a bus bar module including: bus bars that are connected to electrodes of plural batteries (battery cells) forming a battery assembly; and an electric wire routing structure that regulates routing paths of electric wires extending from the bus bars.

As a bus bar module, a bus bar module including an electric wire routing structure is known, the electric wire routing structure including: a gutter-shaped electric wire routing groove that accommodates an electric wire; and a lid that is connected to a first side wall of the electric wire routing groove so as to be rotatable through a hinge and covers the electric wire routing groove so as to block a groove opening (see, for example, the patent document 1: JP-A-2014-233160).
[Patent Document 1] JP-A-2014-233160

According to a related art, in a bus bar module, lid-side hinges are set between some pairs of adjacent lids, however groove-side hinges are set between all the pairs of adjacent electric wire routing grooves. Therefore, when the bus bar module is mounted on the battery assembly, due to an excess number of hinges, a force required to assemble the bus bar module into the battery assembly while expanding and contracting the electric wire routing structure to accommodate a battery stack tolerance increases, and thus a load on an operator increases.

SUMMARY

One or more embodiments provide a bus bar module capable of improving assembly workability while maintaining the strength of an electric wire routing structure, and a power supply unit including the bus bar module.

In an aspect (1), a bus bar module includes a plurality of bus bars in which a plurality of battery cells of a battery assembly electrically connect to each other, a plurality of electric wires electrically connected to the plurality of bus bars, and an electric wire routing structure that accommodates the plurality of electric wires. The electric wire routing structure includes a plurality of electric wire routing grooves formed in an upwardly opening gutter shape and disposed along an overlapping direction of the plurality of battery cells, and a plurality of lids connected to first side walls of the plurality of electric wire routing grooves via hinges so as to be rotatable and covering the plurality of electric wire routing grooves so as to block groove openings of the plurality of electric wire routing grooves, respectively. Groove-side hinges and lid-side hinges are alternately set to be offset from each other in the overlapping direction of the plurality of battery cells, the groove-side hinges connecting the plurality of electric wire routing grooves to each other so that the connected electric wire routing grooves are movable, and the lid-side hinges connecting the plurality of lids to each other so that the connected lids are movable. Either the groove-side hinge between two adjacent electric wire routing grooves of the plurality of electric wire routing grooves or the lid-side hinge between two adjacent lids of the plurality of the lids is disposed in a direction perpendicular to the overlapping direction.

According to the aspect (1), the number of groove-side hinges and lid-side hinges can be reduced compared to the related art, and the electric wire routing structure can be easily expanded and contracted.

Therefore, with the bus bar module, the strength of the electric wire routing structure can be maintained, and assembly workability during assembly into the battery assembly can be improved while expanding and contracting the electric wire routing structure to accommodate a tolerance of the battery assembly.

In an aspect (2), a power supply unit includes a battery assembly that includes a plurality of battery cells and a bus bar module according to claim 1, attached to and overlapped with the battery assembly and electrically connecting the plurality of battery cells to each other.

According to the aspect (2), a bus bar module in which workability is improved during mounting of a bus bar module can be provided.

According to one or more embodiments, it is possible to provide a bus bar module capable of improving assembly workability while maintaining the strength of an electric wire routing structure, and a power supply unit including the bus bar module.

Hereinabove, the present invention has been briefly described. Further, an embodiment of the present invention will be described with reference to the accompanying drawings in order to further clarify the details of the present invention.

BRIEF DESCRIPTION OF THE DRAWINGS

FIG. 5A is a perspective view illustrating major components of the inspection wire routing structure in a state a lid is mounted thereon. FIG. 5B is a perspective view illustrating major components of the inspection wire routing structure in a state the lid is removed;

DETAILED DESCRIPTION

Hereinafter, a bus bar module and a power supply unit according to an embodiment will be described. For convenience of description, in FIG. 1, directions in which respective components and the like are disposed will be described using arrow X, arrow Y, and arrow Z. The arrow X, the arrow Y, and the arrow Z are perpendicular to each other.

Figure 1:
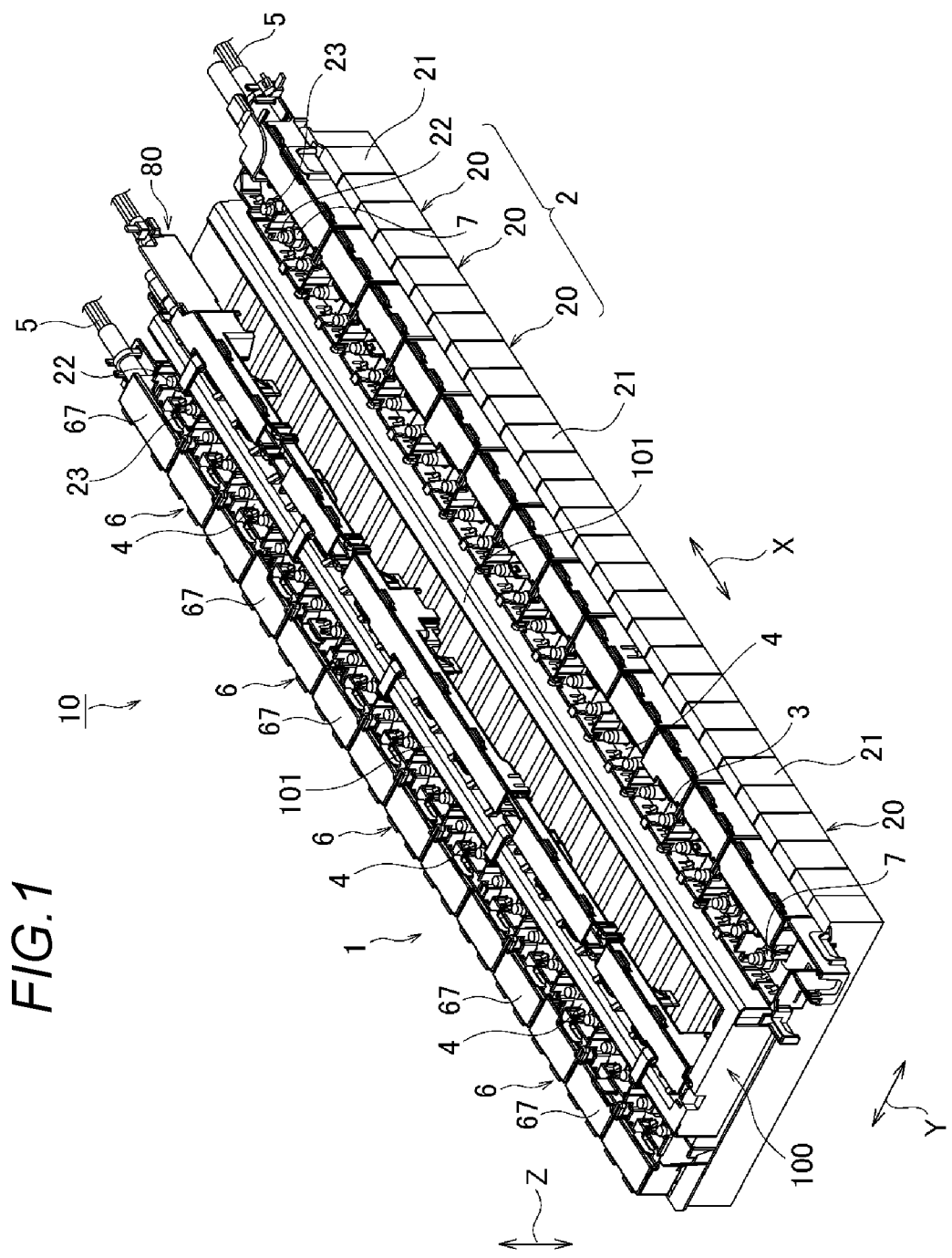
FIG. 1 is a perspective view illustrating a power supply unit including a bus bar module according to an embodiment.

FIG. 1 is a perspective view illustrating a power supply unit 10 including a bus bar module 1 according to an embodiment of the present invention.

The power supply unit 10 illustrated in FIG. 1 includes a battery assembly 2 and a bus bar module 1 that is attached to overlap the battery assembly 2. The power supply unit 10 is used in a state where it is mounted on, for example, an electric vehicle that travels using an electric motor or a hybrid vehicle that travels using an engine and an electric motor together, and supplies to an electric motor.

The battery assembly 2 includes: plural batteries (battery cells) 20 that are disposed in a row along one direction (arrow X direction); and a battery resin frame 100 that fixes the plural batteries 20 together. Each of the batteries 20 includes: a rectangular battery main body 21; and a pair of electrodes 22 and 23 that protrude from one end and the other end of one surface of the battery main body 21, respectively. Among the pair of electrodes 22 and 23, the electrode 22 is a positive electrode, and the electrode 23 is a negative electrode. Each of the pair of electrodes 22 and 23 is formed of a conductive metal in a cylindrical shape. The batteries 20 are disposed such that surfaces of the battery bodies 21 where the pair of electrodes 22 and 23 in the battery main body are provided to face the same direction (upward in FIG. 1) and such that the positive electrode 22 of one battery 20 is adjacent to the negative electrode 23 of another battery 20 adjacent to the one battery 20 (that is, along the arrow X direction in order of the positive electrode 22, the negative electrode 23, the positive electrode 22, the negative electrode 23, . . . ).

In the bus bar module 1, the plural batteries 20 are connected in series. The bus bar module 1 includes plural bus bars 3, plural voltage detection terminals 4, plural electric wires 5, and an electric wire routing structure 6 formed of an insulating resin.

The bus bar 3 is attached to the positive electrode 22 and the negative electrode 23 of the adjacent batteries 20 of the battery assembly 2. As a result, the batteries 20 are connected to each other in series. The bus bar 3 is obtained by pressing a conductive metal plate, and a pair of holes (not illustrated) through which the positive electrode 22 and the negative electrode 23 of the adjacent batteries 20 pass are provided in the substantially rectangular metal plate. The pair of holes are disposed along a longitudinal direction of the bus bar 3 at the same distance as that between the positive electrode 22 and the negative electrode 23 of the adjacent batteries 20. In addition, by fastening nuts 7 to the positive electrode 22 and the negative electrode 23 that have passed through the holes, the bus bar 3 is attached to the batteries 20 and is electrically connected to the positive electrode 22 and the negative electrode 23 adjacent to each other.

The voltage detection terminal 4 is disposed to overlap the corresponding bus bar 3 and is connected to the positive electrode 22 and the negative electrode 23 of the adjacent batteries 20 to each other through the bus bar 3. The voltage detection terminal 4 is obtained, for example, by pressing a conductive metal plate.

The voltage detection terminal 4 overlaps the bus bar 3 and is electrically connected to the bus bar 3. Therefore, one hole (not illustrated) is provided in the center portion of the voltage detection terminal 4. The hole overlaps one of the pair of holes of the bus bar 3, and the positive electrode 22 or the negative electrode 23 of the battery 20 passes therethrough. The voltage detection terminal 4 is attached to the battery 20 by the nut 7 in a state where it overlaps the bus bar 3.

A core wire of the electric wire 5 is electrically connected to the voltage detection terminal 4 in a state where an end portion of the electric wire 5 is pressed. The core wire of the electric wire 5 is connected to the positive electrode 22 and the negative electrode 23 of each of the batteries 20 through the bus bar 3.

In addition, the voltage detection terminal 4 is connected to a voltage detection circuit included in an electronic control unit (ECU; not illustrated) through the electric wire 5 connected to the voltage detection terminal 4. The ECU detects the remaining amount or the state of charge of each of the batteries 20 based on a potential difference (voltage) between the pair of electrodes 22 and 23 of each of the batteries 20 that is detected by the voltage detection circuit.

The electric wire 5 is a well-known covered electric wire including: a conductive core wire; and an insulating coating that covers the core wire. In one end of the electric wire 5, the insulating coating is peeled off, and the core wire is exposed. One end of the electric wire 5 is electrically connected to the voltage detection terminal 4, and the other end of the electric wire 5 is connected to the voltage detection circuit or the like included in the ECU.

Figure 2:
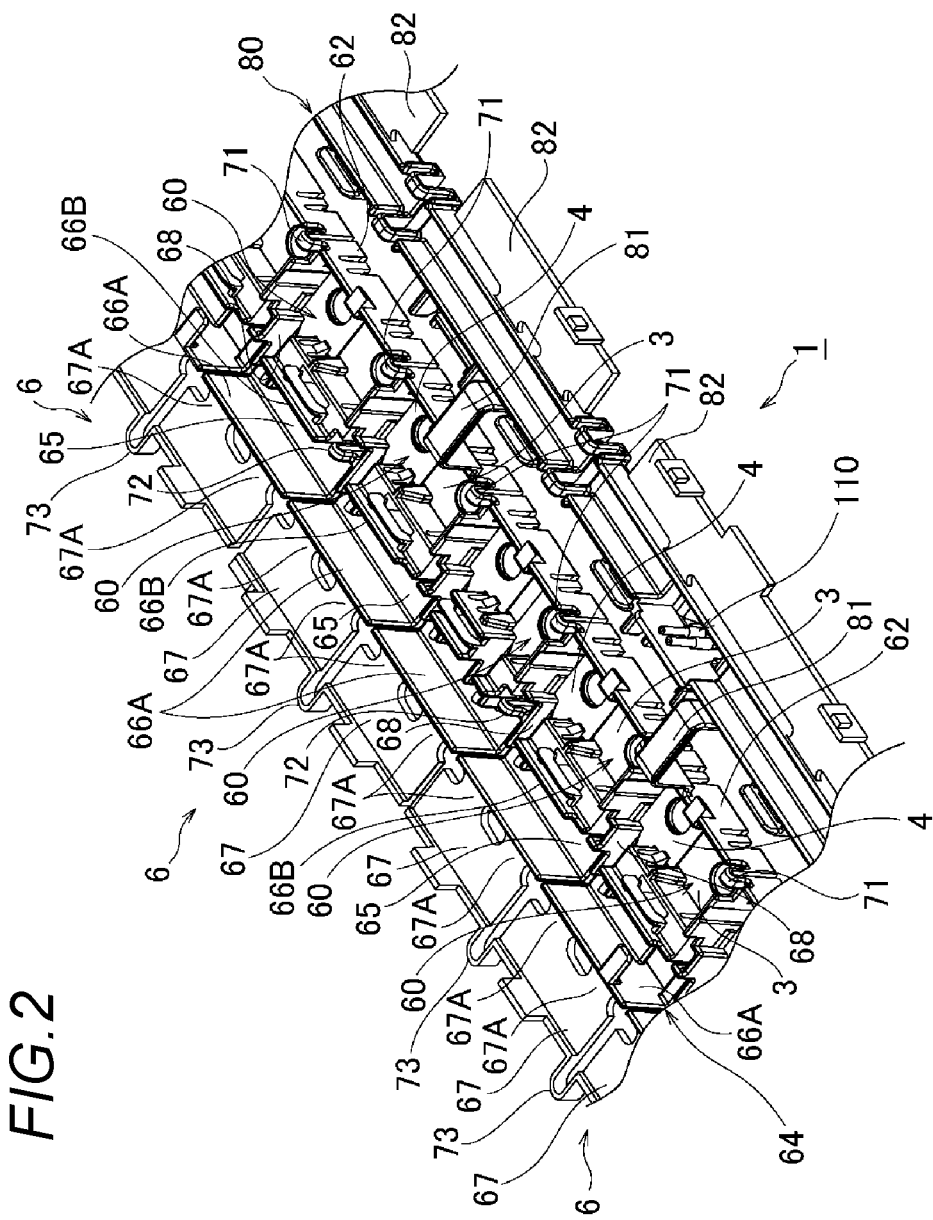
FIG. 2 is an enlarged perspective view illustrating a part of the bus bar module illustrated in FIG. 1 when seen from a bus bar accommodation portion side.
Figure 3:
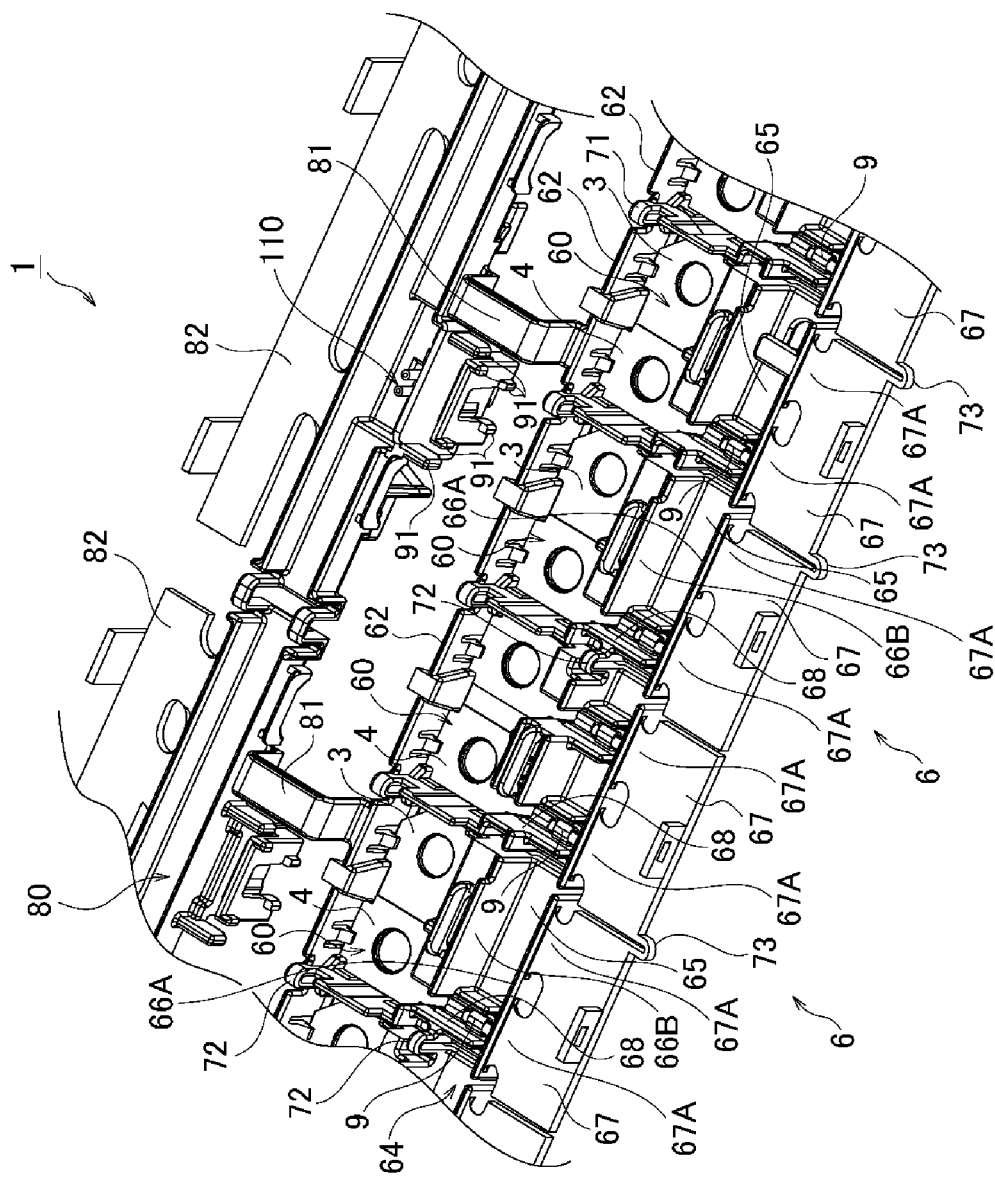
FIG. 3 is an enlarged perspective view illustrating a part of the bus bar module illustrated in FIG. 1 when seen from an electric wire routing groove side.

FIG. 2 is an enlarged perspective view illustrating a part of the bus bar module 1 illustrated in FIG. 1 when seen from a bus bar accommodation portion 60. FIG. 3 is an enlarged perspective view illustrating a part of the bus bar module 1 illustrated in FIG. 1 when seen from an electric wire routing groove 64.

As illustrated in FIGS. 2 and 3, the electric wire routing structure 6 is integrally formed, for example, using a synthetic resin, and includes a bus bar accommodation portion 60, an electric wire routing groove 64, a connecting groove 68, and a lid 67. In addition, an inspection wire routing structure 80 is connected to the electric wire routing structure 6.

Plural bus bar accommodation portions 60 are provided, and are disposed along an overlapping direction of the plural batteries 20. The bus bar accommodation portion 60 is surrounded by a peripheral wall portion 62 and is formed in substantially the same shape as that of the bus bar 3. The bus bar 3 and the voltage detection terminal 4 are accommodated in the bus bar accommodation portion 60. The positive electrode 22 and the negative electrode 23 of each of the batteries 20 pass through the holes of the bus bar 3 in the bus bar accommodation portion 60. Further, either the positive electrode 22 or the negative electrode 23 passes through the hole of the voltage detection terminal 4. The plural bus bar accommodation portions 60 are disposed in a row such that a longitudinal direction thereof follows a disposition direction (the arrow X direction in FIG. 1) of the plural batteries 20.

Plural electric wire routing grooves 64 are provided, and are disposed along the overlapping direction of the plural batteries 20. The electric wire routing groove 64 is provided parallel to one side of each of the bus bar accommodation portions 60. The electric wire routing groove 64 has a substantially U-shape in cross-section including: a bottom wall 65; and a pair of side walls 66A and 66B that vertically extend from opposite edge portions facing each other in a width direction of the bottom wall 65. The electric wire routing groove 64 is formed in an upwardly opening gutter shape. Plural electric wires 5 are accommodated in the electric wire routing groove 64.

The lid 67 is formed in a rectangular plate shape and is provided parallel to one side of each of the electric wire routing grooves 64. The lid 67 covers the electric wire routing groove 64 so as to block a groove opening of the electric wire routing groove 64. A part of one of opposite edge portions (long side portions) of the lid 67 is connected to a first side wall 66A of the electric wire routing groove 64 so as to be rotatable through a hinge 67A.

The connecting groove 68 is formed in a gutter shape, and is provided along the arrow Y direction in FIG. 1 so as to connect the bus bar accommodation portion 60 and the electric wire routing groove 64 to each other. In the connecting groove 68, an electric wire pressing portion 9 (refer to FIG. 3) to which the electric wire 5 of the voltage detection terminal 4 is pressed is disposed.

The inspection wire routing structure 80 is disposed parallel to the disposition direction of the bus bar accommodation portion 60. The inspection wire routing structure 80 is connected to the bus bar accommodation portion 60 through a bridge portion 81 at a distance from each other.

Among the disposed plural bus bar accommodation portions 60 in the electric wire routing structures 6, bus bar accommodation portions 60 adjacent to each other are connected through a bus bar accommodation portion-side hinge 71 opposite to the electric wire routing groove 64. The bus bar accommodation portion-side hinge 71 is a hinge that is formed in a C-shape in cross-section to be elastically deformable, and opposite ends thereof are connected to the peripheral wall portions 62 forming the bus bar accommodation portions 60. The bus bar accommodation portions 60 connected through the bus bar accommodation portion-side hinge 71 are movable relative to each other.

In addition, among the disposed plural electric wire routing grooves 64, every other or every few pairs of adjacent electric wire routing grooves 64 are appropriately connected through groove-side hinges 72. The groove-side hinge 72 is a hinge that is formed in a C-shape in cross-section to be elastically deformable, and opposite ends thereof are connected to the second side walls 66B of the electric wire routing grooves 64. The electric wire routing grooves 64 connected through the groove-side hinge 72 are movable relative to each other.

Further, among the disposed plural lids 67, every other or every few pairs of adjacent lids 67 are appropriately connected through lid-side hinges 73. The lid-side hinge 73 is a hinge that is formed in a C-shape in cross-section to be elastically deformable, and opposite ends thereof are connected to the lids 67. The lids 67 connected through the lid-side hinge 73 are movable relative to each other.

In addition, the groove-side hinges 72 that the electric wire routing grooves 64 to each other and the lid-side hinges 73 that connect the lids 67 to each other are alternately set to be offset from each other in the overlapping direction of the batteries 20. Either the groove-side hinge 72 or the lid-side hinge 73 is disposed between the electric wire routing groove 64 and the lid 67 adjacent to each other.

In the bus bar module 1 according to the embodiment including the electric wire routing structures 6 having the above-described configuration, by elastically deforming the bus bar accommodation portion-side hinges 71, the groove-side hinges 72, and the lid-side hinges 73, the distances between adjacent bus bar accommodation portions 60, between adjacent electric wire routing grooves 64, and between the lids 67 in the overlapping direction of the batteries 20 can be reduced or increased and a shape error of each of the batteries 20, the electric wire routing structure 6, or the like can be accommodated. As a result, assembly workability of the power supply unit 10 can be improved.

Further, the bus bar accommodation portion-side hinges 71 that connect the disposed plural bus bar accommodation portions 60 cooperate with the groove-side hinges 72 or the lid-side hinges 73 such that the entire strength of the electric wire routing structures 6 can be maintained.

Figure 4:
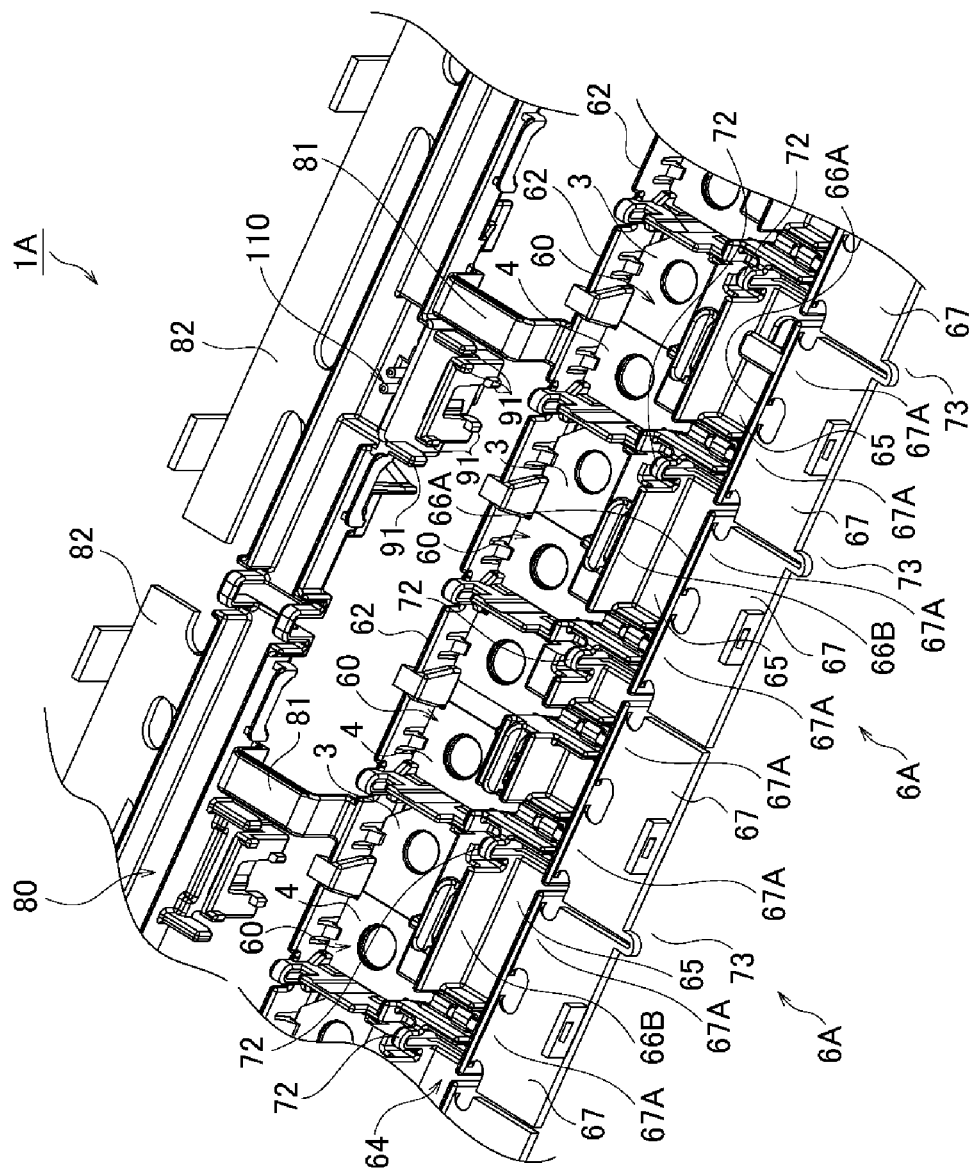
FIG. 4 is an enlarged perspective view illustrating a part of a bus bar module according to a reference example when seen from an electric wire routing groove side.

FIG. 4 is an enlarged perspective view illustrating a part of a bus bar module 1A according to a reference example when seen from an electric wire routing groove 64;

As illustrated in FIG. 4, in electric wire routing structures 6A of the bus bar module 1A according to the reference example, electric wire routing grooves 64 adjacent to each other are connected to each other through the groove-side hinge 72, and lids 67 adjacent to each other are connected to each other through the lid-side hinge 73. In the electric wire routing structures 6A, the components are connected by an excess number of the groove-side hinges 72 and the lid-side hinges 73. Therefore, a force required to assemble the electric wire routing structures 6A into the battery assembly 2 while expanding and contracting the electric wire routing structures 6A to accommodate a tolerance of the battery assembly 2 increases, and thus a load on an operator increases.

On the other hand, in the bus bar module 1 according to the embodiment, the groove-side hinges 72 that the electric wire routing grooves 64 to each other and the lid-side hinges 73 that connect the lids 67 to each other are alternately set to be offset from each other in the overlapping direction of the batteries 20, and either the groove-side hinge 72 or the lid-side hinge 73 is disposed between the electric wire routing groove 64 and the lid 67 adjacent to each other. As a result, an excess number of hinges can be reduced, and thus, assembly workability can be improved while maintaining the strength of the electric wire routing structures 6. Accordingly, in the embodiment, the power supply unit 10 in which workability is improved during mounting of the bus bar module 1 can be provided.

In the embodiment, connection portions of two adjacent electric wire routing groove 64 are connected through one groove-side hinge 72, and connection portions of two adjacent lids 67 are connected through one lid-side hinge 73. However, two adjacent electric wire routing grooves 64 may be connected through two or more groove-side hinges 72, and two adjacent lids 64 may be connected through two or more lid-side hinges 73. Even in this case, connection portions of adjacent electric wire routing grooves 64 connected through the groove-side hinges 72 and connection portions of adjacent lids 67 connected through the lid-side hinges 73 are alternately set.

Next, the inspection wire routing structure 80 of the bus bar module 1 according to the embodiment will be described.

Figure 5A:
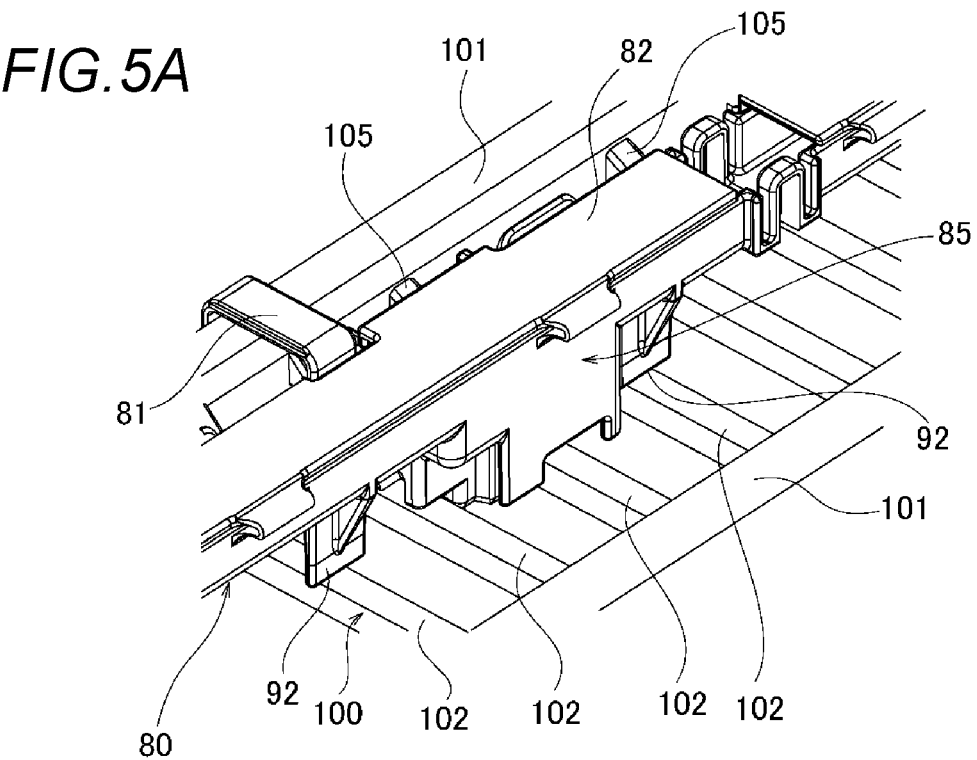
FIGS. 5A and 5B are diagrams illustrating a thermistor accommodation portion of an inspection wire routing structure.
Figure 5B:
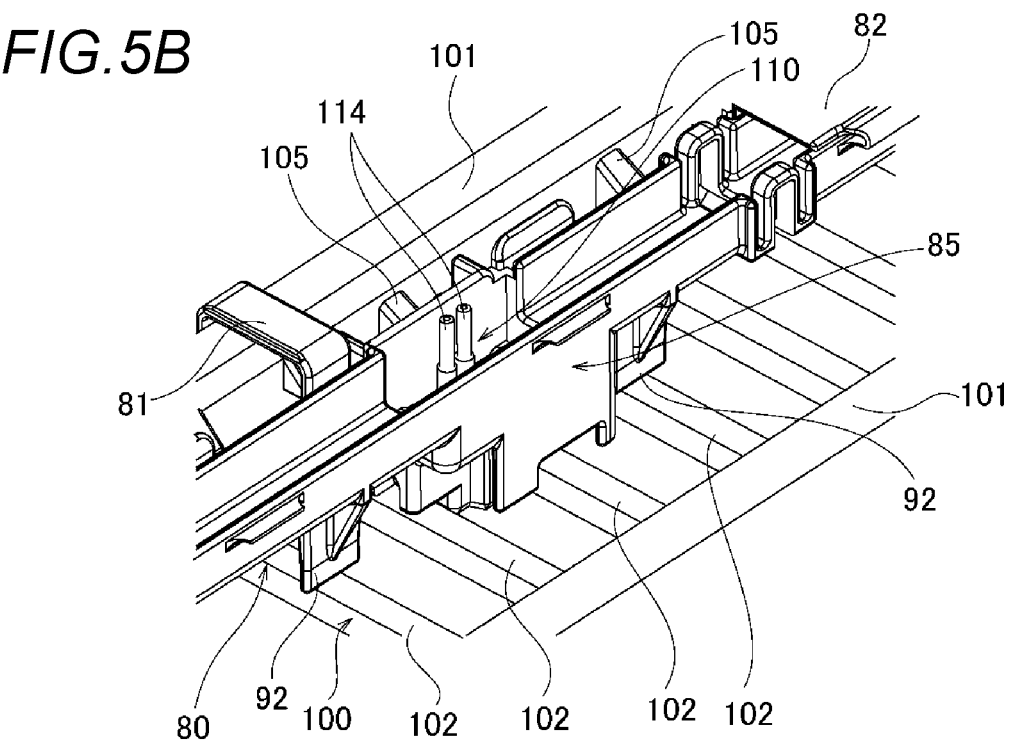
Figure 6:
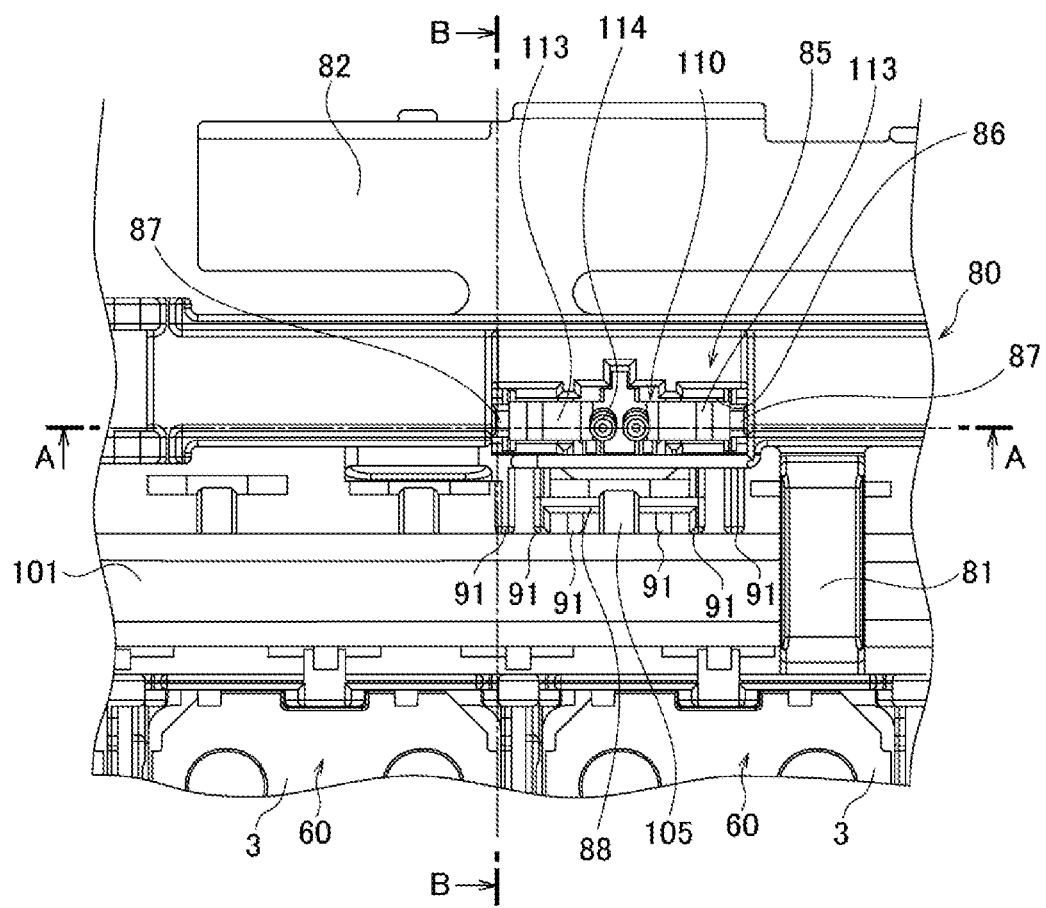
FIG. 6 is a plan view illustrating the thermistor accommodation portion of the inspection wire routing structure.
Figure 7:
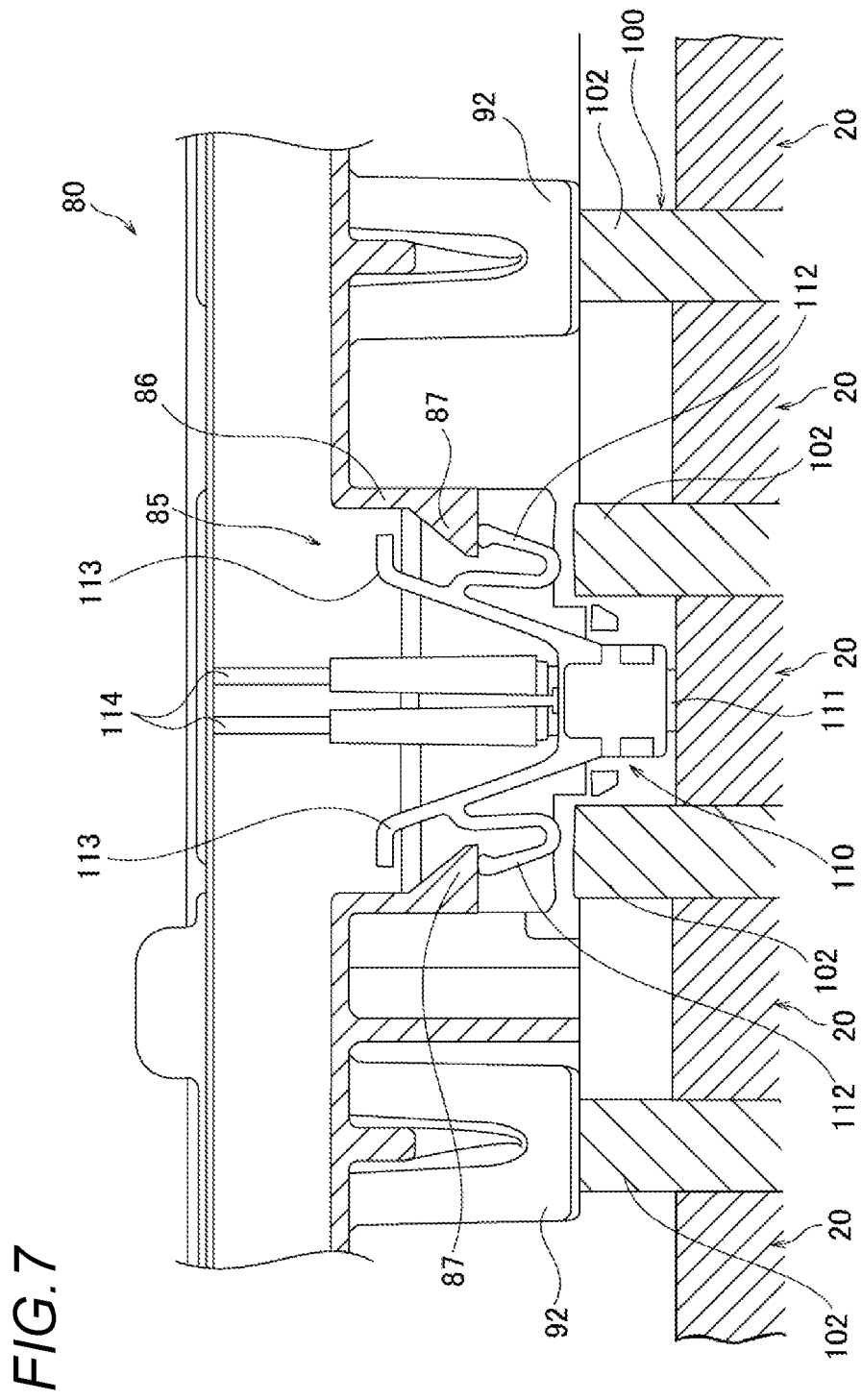
FIG. 7 is a cross-sectional view taken along line A-A of FIG. 6.
Figure 8:
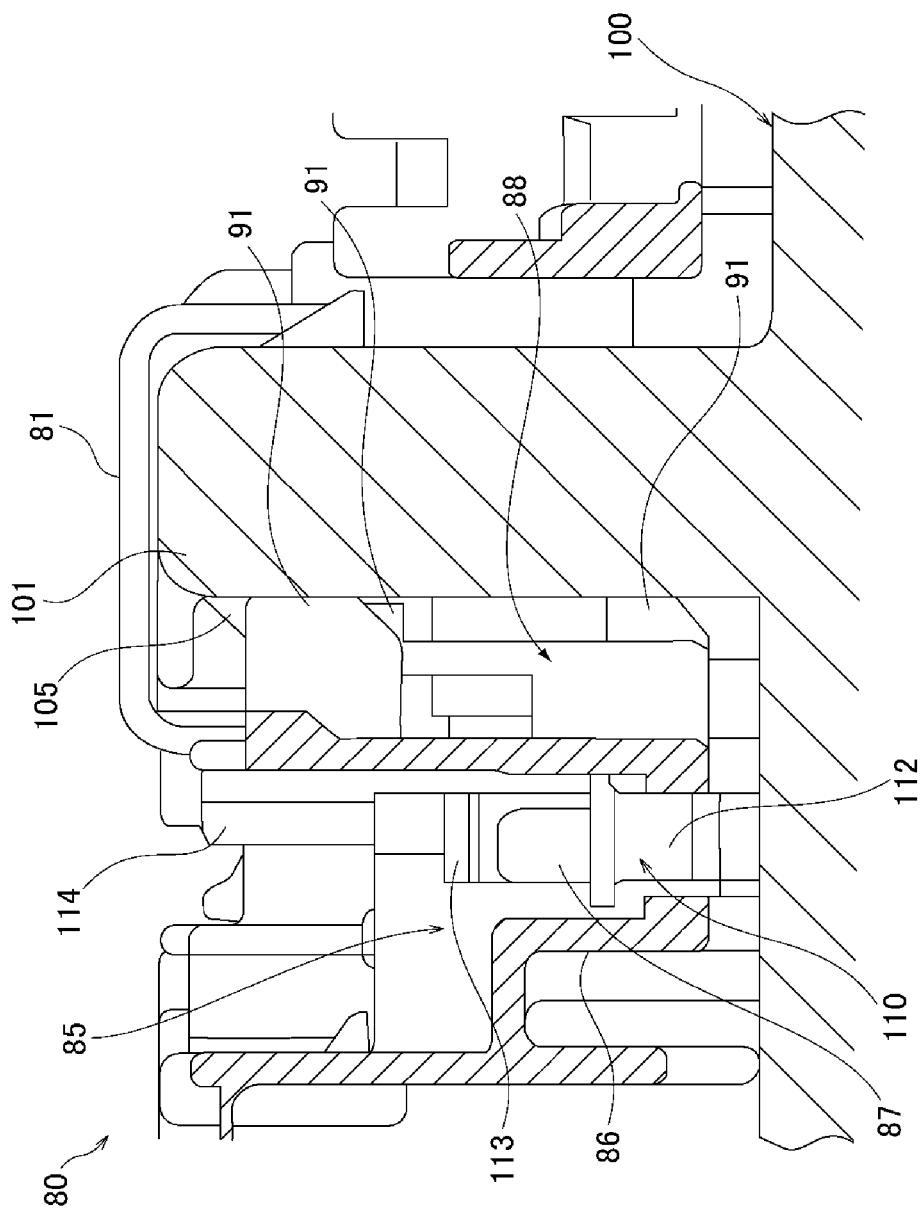
FIG. 8 is a cross-sectional view taken along line B-B of FIG. 6.
Figure 9:
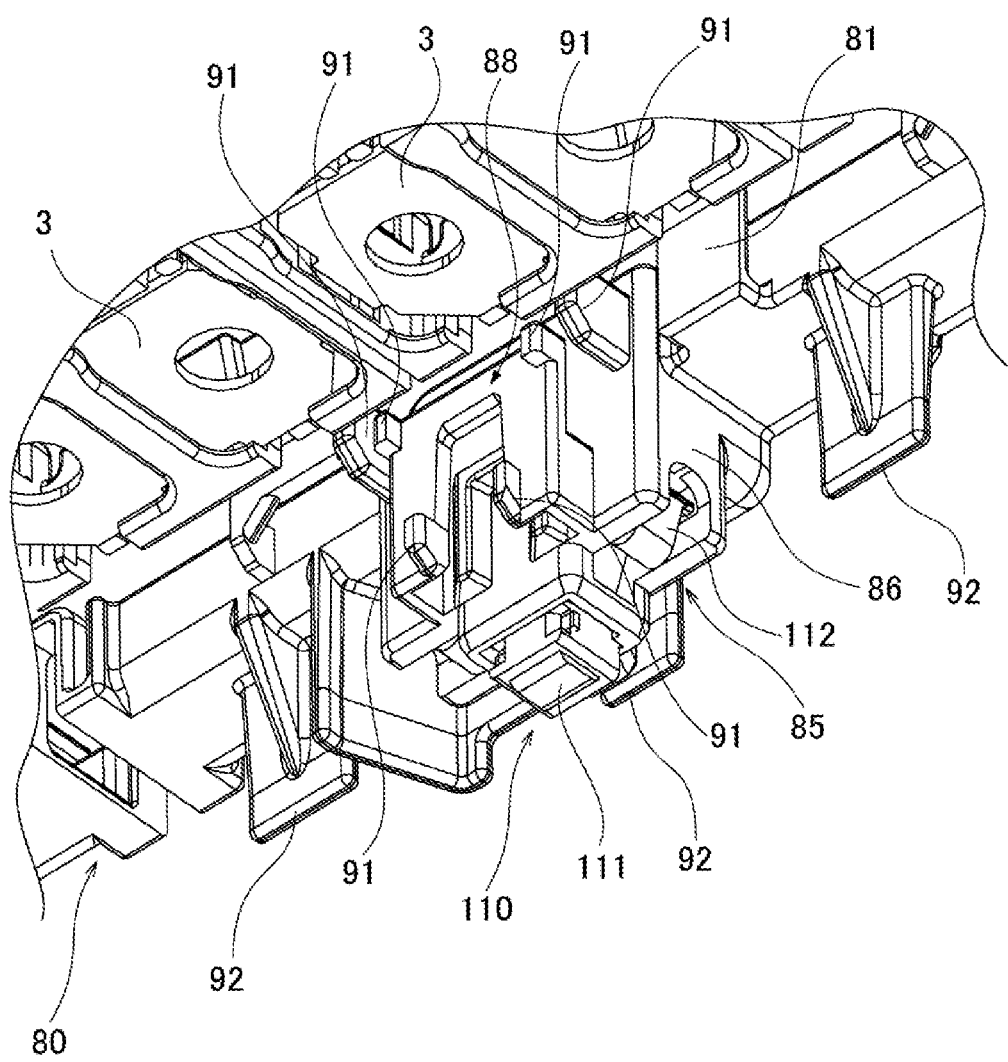
FIG. 9 is a perspective view illustrating the thermistor accommodation portion of the inspection wire routing structure when seen from the bottom.

FIGS. 5A and 5B are diagrams illustrating a thermistor accommodation portion 85 of the inspection wire routing structure 80, in which FIG. 5A is a perspective view illustrating major components of the inspection wire routing structure 80 in a state a lid 82 is mounted thereon, and FIG. 5B is a perspective view illustrating major components of the inspection wire routing structure 80 in a state the lid 82 is removed. FIG. 6 is a plan view illustrating the thermistor accommodation portion 85 of the inspection wire routing structure 80. FIGS. 7 and 8 are a cross-sectional view taken along line A-A of FIG. 6 and a cross-sectional view taken along line B-B of FIG. 6, respectively. FIG. 9 is a perspective view illustrating the thermistor accommodation portion 85 of the inspection wire routing structure 80 when seen from the bottom.

As illustrated in FIGS. 5A and 5B, the inspection wire routing structure 80 connected to the electric wire routing structure 6 through the bridge portion 81 is connected to the bus bar accommodation portion 60 at a distance from each other. The battery assembly 2 on which the inspection wire routing structure 80 is mounted includes the battery resin frame 100. The battery resin frame 100 includes a pair of longitudinal beam portions 101 disposed along the disposition direction of the batteries 20, and the longitudinal beam portions 101 are disposed at a distance from each other. In addition, the battery resin frame 100 includes plural partition walls 102 connected to the longitudinal beam portions 101. Each of the partition walls 102 is disposed between battery main bodies 21 adjacent to each other at a distance from each other. The inspection wire routing structure 80 connected to the electric wire routing structure 6 through the bridge portion 81 is disposed such that one longitudinal beam portion 101 of the battery resin frame 100 is interposed between the bus bar accommodation portion 60 and the inspection wire routing structure 80. The inspection wire routing structure 80 is formed in an upwardly opening gutter shape. The inspection wire routing structure 80 includes the lid 82, and the lid 82 is mounted on the inspection wire routing structure 80 from the top so as to block the top of the inspection wire routing structure 80.

As illustrated in FIGS. 6 to 8, the inspection wire routing structure 80 includes the thermistor accommodation portion 85, and a thermistor 110 is accommodated in the thermistor accommodation portion 85. The thermistor accommodation portion 85 includes a square cylindrical fitting cylinder 86 to which the thermistor 110 is fitted from the top. The fitting cylinder 86 of the thermistor accommodation portion 85 includes a locking portion 88 that is formed in a frame shape on the longitudinal beam portion 101 side of the battery resin frame 100 of the battery assembly 2. An engaging protrusion 105 is formed on a side surface of the longitudinal beam portion 101, and this engaging protrusion 105 engages with the locking portion 88. By the locking portion 88 engaging with the engaging protrusion 105, the inspection wire routing structure 80 is held in the battery resin frame 100 of the battery assembly 2.

A temperature detection portion 111 is provided in a tip end of the thermistor 110, and an engaging portion 113 including an elastic piece 112 is provided in each of opposite side portions of the thermistor 110. An inspection wire 114 is drawn out from a rear end of the thermistor 110. The inspection wire 114 is accommodated and routed in the inspection wire routing structure 80, and is connected to a temperature detection circuit included in an ECU (not illustrated). This ECU detects the state of the battery assembly 2 and the like based on the temperature of the battery assembly 2 detected by the temperature detection circuit.

A fixing protrusion 87 that protrudes inwardly is formed at each of opposite end portions in the fitting cylinder 86 (refer to FIGS. 6 and 7). The fixing protrusions 87 engage with the elastic pieces 112 of the thermistor 110 inserted into the fitting cylinder 86. By engaging the elastic pieces 112 with the fixing protrusions 87, the thermistor 110 is held in the thermistor accommodation portion 85, and the temperature detection portion 111 is pressed against an upper surface of the battery 20 of the battery assembly 2 due to an elastic force of the elastic pieces 112.

As illustrated in FIG. 9, plural transverse ribs 91 that protrude to the longitudinal beam portion 101 side of the battery resin frame 100 are formed in the thermistor accommodation portion 85. Four transverse ribs 91 are disposed on the upper side of the thermistor accommodation portion 85, and two transverse ribs 91 are disposed on the lower side of the thermistor accommodation portion 85. Among the four transverse ribs 91 disposed on the upper side, two inner transverse ribs 91 are formed in the locking portion 88, and two outer transverse ribs 91 are formed such that the locking portion 88 on a side surface of the fitting cylinder 86 is interposed therebetween. The two transverse ribs 91 disposed on the lower side are formed in the locking portion 88. Tip ends of the transverse ribs 91 come into contact with side surfaces of the longitudinal beam portions 101 in the battery resin frame 100 and prevent the thermistor accommodation portion 85 from tilting in a transverse direction.

In addition, in the bottom of the inspection wire routing structure 80, two longitudinal ribs 92 are formed on opposite sides in a longitudinal direction between which the fitting cylinder 86 of the thermistor accommodation portion 85 is interposed. Tip ends of the longitudinal ribs 92 come into contact with upper surfaces of the partition walls 102 in the battery resin frame 100 and prevent the thermistor accommodation portion 85 from tilting in a longitudinal direction.

With the above-described configuration, the transverse ribs 91 and the longitudinal ribs 92, which are disposed around the locking portion 88 formed in the fitting cylinder 86, come into contact with the battery resin frame 100 of the battery assembly 2 such that the thermistor accommodation portion 85 is prevented from tilting in the transverse direction and in the longitudinal direction. Accordingly, the posture of the thermistor 110 accommodated in the fitting cylinder 86 of the thermistor accommodation portion 85 can be stabilized, the state where the temperature detection portion 111 is in contact with the battery resin frame 100 of the battery assembly 2 can be reliably maintained, and the detection accuracy of the temperature can be improved. In particular, by providing the tilting preventing structure including the transverse ribs 91 and the longitudinal ribs 92 in the vicinity of the thermistor accommodation portion 85, the thermistor accommodation portion 85 can be set even in a position other than a position adjacent to the bus bar accommodation portion 60, and a position where the temperature is detected by the thermistor 110 can be freely set.

The present invention is limited to the above-described embodiment, and modifications, improvements, and the like can be appropriately made. In addition, the materials, shapes, dimensions, numbers, disposition positions, and the like of various components in the embodiment are arbitrary and are not particularly limited as long as the present invention can be achieved.

Here, the characteristics of the embodiment of the bus bar module and the power supply unit according to the present invention will be collectively and briefly described in the following [1] and [2].

[1] A bus bar module (1) comprising:
a plurality of bus bars (3) in which a plurality of battery cells (batteries 20) of a battery assembly (2) electrically connect to each other;
a plurality of electric wires (5) electrically connected to the plurality of bus bars (3); and
an electric wire routing structure (6) that accommodates the plurality of electric wires (5),
wherein the electric wire routing structure (6) includes a plurality of electric wire routing grooves (64) formed in an upwardly opening gutter shape and disposed along an overlapping direction of the plurality of battery cells (batteries 20), and a plurality of lids (67) connected to first side walls (66A) of the plurality of electric wire routing grooves (64) via hinges (67A) so as to be rotatable and covering the electric wire routing grooves (64) so as to block groove openings of the plurality of electric wire routing grooves (64), respectively,
wherein groove-side hinges (72) and lid-side hinges (73) are alternately set to be offset from each other in the overlapping direction of the plurality of battery cells (batteries 20), the groove-side hinges (72) connecting the plurality of electric wire routing grooves (64) to each other so that the connected electric wire routing grooves (64) are movable, and the lid-side hinges (73) connecting the plurality of lids (67) to each other so that the connected lids (67) are movable, and
wherein either the groove-side hinge (72) between two adjacent electric wire routing grooves of the plurality of electric wire routing grooves (64) or the lid-side hinge (73) between two adjacent lids of the plurality of the lid (67) is disposed in a direction perpendicular to the overlapping direction.

[2] A power supply unit comprising:
a battery assembly (2) that includes a plurality of battery cells (batteries 20); and
a bus bar module (1) according to [1], attached to and overlapped with the battery assembly (2) and electrically connecting the plurality of battery cells (batteries 20) to each other.

DESCRIPTION OF REFERENCE NUMERALS AND SIGNS

1: BUS BAR MODULE
2: BATTERY ASSEMBLY
3: BUS BAR
5: ELECTRIC WIRE
6: ELECTRIC WIRE ROUTING STRUCTURE
10: POWER SUPPLY UNIT
20: BATTERY (BATTERY CELL)
64: ELECTRIC WIRE ROUTING GROOVE
66A, 66B: SIDE WALL
67: LID
67A: HINGE
72: GROOVE-SIDE HINGE
73: LID-SIDE HINGE

What is claimed is:

1. A bus bar module comprising:
a plurality of bus bars in which a plurality of battery cells of a battery assembly electrically connect to each other;
a plurality of electric wires electrically connected to the plurality of bus bars; and
an electric wire routing structure that accommodates the plurality of electric wires,
wherein the electric wire routing structure includes a plurality of electric wire routing grooves formed in an upwardly opening gutter shape and disposed along an overlapping direction of the plurality of battery cells, and a plurality of lids connected to first side walls of the plurality of electric wire routing grooves via hinges so as to be rotatable and covering the plurality of electric wire routing grooves so as to block groove openings of the plurality of electric wire routing grooves, respectively,
wherein groove-side hinges and lid-side hinges are alternately set to be offset from each other in the overlapping direction of the plurality of battery cells, the groove-side hinges directly connecting the plurality of electric wire routing grooves to each other so that the connected electric wire routing grooves are movable, and the lid-side hinges connecting the plurality of lids to each other so that the connected lids are movable,
wherein either the groove-side hinge between two adjacent electric wire routing grooves of the plurality of electric wire routing grooves or the lid-side hinge between two adjacent lids of the plurality of the lids is disposed in a direction perpendicular to the overlapping direction,
wherein the plurality of electric wire routing grooves have second side walls opposite the first side walls, the first side walls and the second side walls both extending along the overlapping direction, and
wherein the groove-side hinges are directly connected to the second side walls.

2. A power supply unit comprising:
a battery assembly that includes a plurality of battery cells; and
a bus bar module according to claim 1, attached to and overlapped with the battery assembly and electrically connecting the plurality of battery cells to each other.

3. The bus bar module according to claim 1, wherein the bus bar module forms a power supply unit that is used in a hybrid vehicle or an electric vehicle.

4. The bus bar module according to claim 1,
wherein the battery assembly includes the plurality of battery cells that are disposed in a row along one direction and a battery resin frame that fixes the plural batteries together.

5. The bus bar module according to claim 1,
wherein the bus bar module includes plural bus bars, the plurality of voltage detection terminals, the plurality of electric wires, and the electric wire routing structure formed of an insulating resin.

6. The bus bar module according to claim 1,
wherein the plurality of bus bars are placed in a plurality of corresponding bus bar accommodation portions, and
the plurality of groove-side hinges are separate and spaced away from the plurality of bus bar accommodation portions.

7. The bus bar module according to claim 1,
wherein the plurality of groove-side hinges and the plurality of electric wire routing grooves are aligned with each other along an overlapping direction of the plurality of battery cells.

8. The bus bar module according to claim 1,
wherein each of the plurality of groove-side hinges are formed between an adjacent pair of the plurality of electric wire routing grooves.

* * * * *